United States Patent [19]

Uney et al.

[11] Patent Number: 4,768,541
[45] Date of Patent: Sep. 6, 1988

[54] MEANS OF EXPELLING PARALLEL TANKS TO LOW RESIDUALS

[75] Inventors: Preston E. Uney, Pine; James R. Tegart, Littleton; David R. Abbott, Indian Hills, all of Colo.

[73] Assignee: Martin Marietta Corporation, Bethesda, Md.

[21] Appl. No.: 925,986

[22] Filed: Nov. 3, 1986

[51] Int. Cl.[4] ............................................. B64G 1/00
[52] U.S. Cl. .................................... 137/154; 137/255; 137/590
[58] Field of Search ..................... 137/255, 154, 590

[56] References Cited

U.S. PATENT DOCUMENTS

| | | |
|---|---|---|
| 2,519,393 | 8/1950 | Noyes . |
| 2,609,118 | 9/1952 | Cattaneo . |
| 2,621,719 | 12/1952 | Eaton et al. . |
| 3,720,389 | 3/1973 | Ferris . |
| 3,744,738 | 4/1973 | Howard . |
| 3,981,321 | 9/1976 | Risse ................................... 137/255 |
| 4,168,718 | 9/1979 | Hess et al. . |
| 4,399,831 | 8/1983 | Robert ............................. 137/590 X |
| 4,489,745 | 12/1984 | Nelter ............................. 137/590 X |

*Primary Examiner*—Alan Cohan
*Attorney, Agent, or Firm*—Fields, Lewis, Pittenger & Rost

[57] ABSTRACT

A multiple tank flow system is provided in which a plurality of liquid storage tanks or reservoirs are connected with their outlets in parallel with the piping arranged so that the outlet from each tank shall have the same or similar pressure drop at a specific flow rate. A surface tension retaining device is mounted within each tank at the outlet opening to prevent the pressurization gas within the tank from entering the outlet while liquid is still flowing from one or more of the tanks within the system. The surface tension device can be of any suitable design such as a saucer-shaped arrangement having relatively thick, flat support members forming the structure with suitable screen-type material positioned across the entire outer surface of the support members. The size of the openings within the screen material is arranged to provide an adequate surface tension film to produce a required liquid/gaseous interface to prevent the pressurization gas from entering the tank outlet.

6 Claims, 2 Drawing Sheets

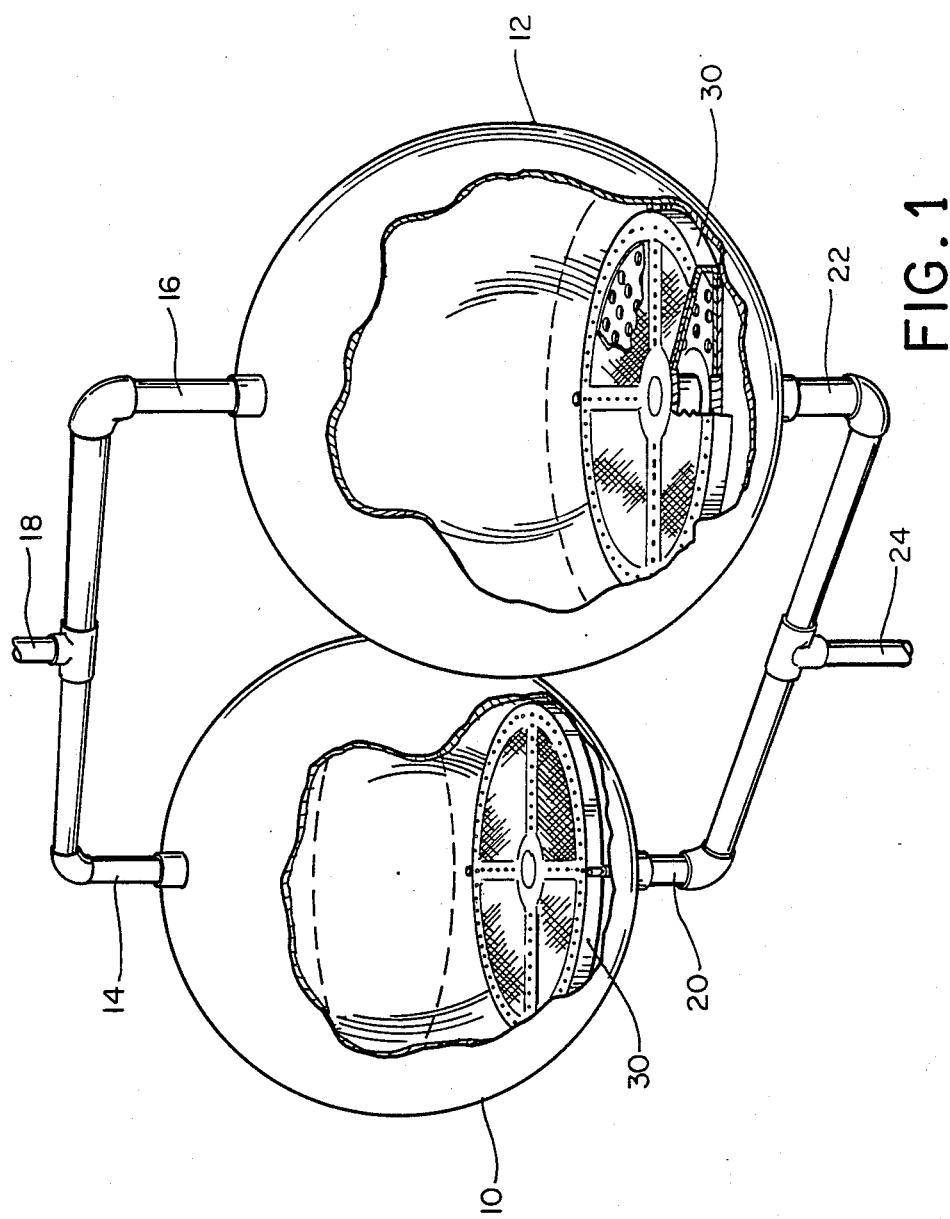

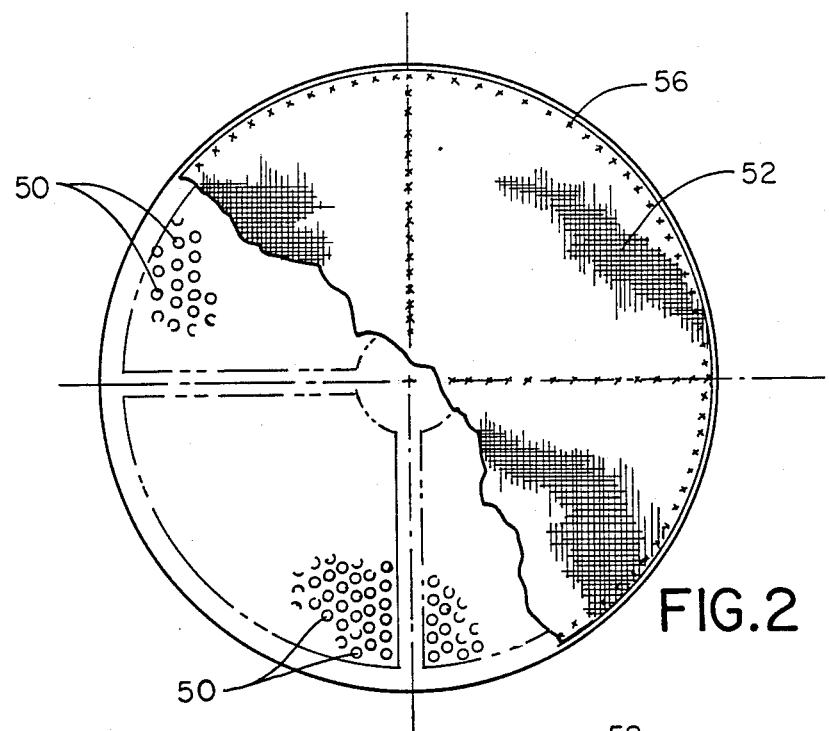
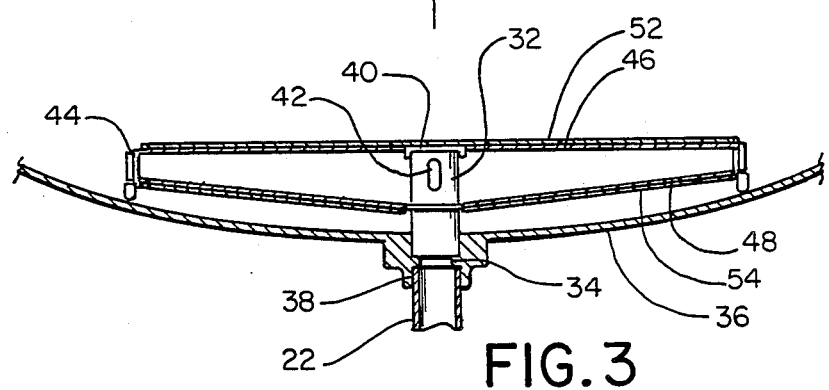

MEANS OF EXPELLING PARALLEL TANKS TO LOW RESIDUALS

FIELD OF THE INVENTION

This invention is directed to a liquid dispensing system for multiple tanks. It is more specifically directed to a device positioned in the outlet of each tank to balance the output flow and minimize the residual liquid remaining in the individual vessels.

BACKGROUND OF THE INVENTION

Simultaneous use of a number of liquid storage vessels or tanks having their outlets connected in parallel to a common feed or drain pipe is well known in the art. Certain problems occur when this type of piping arrangement is used. A sample of these problems is the connecting of propellant tanks in a space craft wherein the propellant is fed from the outlet of each tank to a common feed line for the main propulsion rocket engines or attitude control engines. A major problem arises when the parallel propellant tanks drain unevenly which can be caused from a number of factors or conditions. Examples of these conditions could be that the tanks were not equally filled prior to use or that the outlet piping from each of the tanks has different flow restrictions and thus, different flow rates. It is quite important when dealing with propellants that each of the tanks be drained equally to the lowest possible level without introducing air or pressurization gas into the propellant outlet feed system. Once gas is introduced into the common outlet pipe the liquid flow from all remaining tanks is stopped. Thus, if gas is prematurely introduced into the propellant feed line, the propellant flow would be interrupted causing the engine to shut down prematurely preventing full usage of all propellants available with possible mission failure.

In prior tank systems it was common practice to estimate the total liquid level quantities within the tanks. In most cases it is possible to estimate within 5-10% of the actual tank liquid volume. The liquid load would then be increased by the estimated potential error so that early depletion of one tank prior to the others would not occur. In some cases the installation of isolation valves such as check valves can prevent transfer between tanks and calibration of the flow losses of the liquid outlet system can help to equalize the actual liquid flow rate within the system. These solutions, however, are unnecessary when the arrangement according to the present invention is utilized.

Throughout this application although direct reference may be made to space craft propellant feed systems, it is to be understood that this invention can be applied to any liquid supply system having parallel multiple tanks that must provide gas-free liquid and continuous flow reliability.

INFORMATION DISCLOSURE STATEMENT

The following patents which are listed and described are believed to be the most pertinent patents to this invention which are known by the inventors. This list is provided in order to comply with the inventors' duty to disclose to the Patent Office information which is material to the examination of this application.

The Noyes patent (U.S. Pat. No. 2,519,393) shows an improved bladder type fuel tank. A novel flexible bladder innerlining is provided which is arranged to fit snugly with the interior contour of the conventional ribbed metal aircraft tank. The flexible inner liner is preformed and shaped to conform to grooves or channel portions provided within the tank. As the propellant is drained from the tank the liner contracts causing the residual fuel to move toward the outlet opening.

The Cattaneo patent (U.S. Pat. No. 2,609,118) provides an aircraft fuel tank having an internal flexible fuel cell which separates the air in the tank from the fuel. As the tank is filled with liquid the bladder is dilated. As the fuel is removed through the outlet the bladder is caused to collapse maintaining the separation of the fuel from the pressurization gas and directing the fuel to the outlet opening.

The Eaton, et al. patent (U.S. Pat. No. 2,621,719) also shows an aircraft fuel tank having internal flexible bladders in the fore and aft section of the tank. A pressurization gas is introduced on the opposite side of the bladders from the fuel and as the fuel is drained from the tank the bladders cause the fuel to remain centralized within the tank with pressurization gas confined to the outer edges.

The Ferris patent (U.S. Pat. No. 3,720,389) shows a missile fuel tank having an internal three-lobed bladder supported by an internal structural framework. Two lobes of the bladder are temporarily bonded to the inner surface of the tank while the third lobe remains loose. As fuel is used from the tank the free lobe is allowed to contract with the other two lobes progressively pulling inwardly from the tank wall allowing the bladder to force the liquid to the outlet opening.

The Frosch patent (U.S. Pat. No. 4,168,718) discloses a passive propellant fuel tank system which will provide gas-free propellant flow in a zero gravity environment. The propellant system includes a dual compartment propellant tank with independent surface tension channels in each compartment. The acquisition channels provide a gas-free liquid propellant to flow to the outlet in only one direction.

The Howard patent (U.S. Pat. No. 3,774,738) provides a liquid transfer device in a propellant tank for use in a zero gravity environment. A spiral-shaped screen member is provided within the tank for collecting the randomly dispersed propellant and transferring the liquid propellant to the outlet port. The spiral screen is formed from a closely woven stainless steel wire.

SUMMARY OF THE INVENTION

In the present invention where a number of propellant tanks are interconnected with a common outlet and pressurization pipes, a screen-type surface tension retention device is provided within each tank so as to cover and enclose the individual tank outlet opening. Although it is anticipated that any number of tanks can be interconnected in this way, it is expected that the arrangement will probably be most commonly utilized with the interconnection of two or three propellant tanks. The outlet piping from each tank is expected to be designed in such a way that flow restrictions and the pressure drop within each tank outlet will be approximately the same or at least held to a minimum.

The surface tension retention arrangement according to the present invention utilizes individual devices, each having their surface areas covered with a wire mesh screen material. The total screen surface area of the devices are designed to provide a minimum restriction to the liquid flow from the tank whereby maximum propellant flow required for operation of the system can be provided from one tank and its associated surface tension device.

A number of suitable configurations can be provided for the surface tension retention device such as the internal surface area of the propellant tank near the propellant outlet opening can be provided with a wire mesh shaped screen which follows the internal contours of the tank and can have its outer edge sealed to the inner surface of the tank forming a chamber within the screen enclosing the outlet opening. Another embodiment may be a cylindrical housing positioned in conjunction with the outlet opening wherein the sides of the cylinder are enclosed with a wire mesh material. A preferred embodiment is a flat, hollow disk-shaped structure having a flat or conical upper and lower surface formed by a wire mesh material with the internal cavity communicating directly with the tank outlet. The support surface members of the flat disk positioned directly below the screen material may have a number of large apertures formed in the surface to reduce the pressure drop across the device and yet provide structural support for the screen material while propellant is flowing through the device and the outlet of the tank. This arrangement can substantially reduce the total overall pressure drop across the device during usage.

It is important in the design of a system of this nature that the pressure drop encountered flowing through the devices and in the outlet and piping of each of the individual tanks be less than the strength of the surface tension pressure retention capability provided by the liquid in the pores of the screen material. In this way the actual surface tension of the liquid in the screen material will produce a liquid/gas interface which will prevent the passage of the pressurization gas into the outlet opening of the tank so long as there is liquid present and flowing from at least one of the parallel tanks.

BRIEF DESCRIPTION OF THE DRAWINGS

This invention will be more readily understood from the reading of the following specification and by reference to the accompanying drawings forming a part thereof, wherein an example of the invention is shown and wherein:

FIG. 1 is an isometric pictorial view showing multiple liquid tanks connected in parallel with a portion of the sidewall of each tank cut away to show; a surface tension retaining device according to the present invention connected at the outlet of the tanks;

FIG. 2 is a top plan view of the surface tension device as shown in FIG. 1; and

FIG. 3 is a side cross-sectional view taken along the lines 3—3 of FIG. 1 showing the outlet connection between the surface tension device and the outlet from a tank.

DETAILED DESCRIPTION OF THE DRAWINGS

Turning now more specifically to the drawings, FIG. 1 shows a plurality of propellant fuel tanks or vessels 10, 12 having inlet pressurization pipes 14, 16, and outlet pipes 20, 22, respectively. The inlet pipes 14, 16 are interconnected by crossover pipes to a single inlet or pressurization line 18. Outlet pipes 20, 22 are connected together by suitable crossover or interconnecting piping which are connected to a single common outlet feed line 24. Usually pipe 24 is connected directly to an engine or another reservoir or sump (not shown). As shown in FIG. 1 the sides of tanks 10 ard 12 have been cut away to show the interior contents of the tanks. Located within each tank is a surface tension retaining device 30 which is connected directly to and completely encloses the tank outlet opening which is in turn connected to the outlet pipe 20 or 22.

It is to be understood that each tank shall include a surface tension device which functions substantially as shown and described herein. The devices themselves do not have to be identical so long as they perform the required function.

The surface tension device 30 in tank 12 will be specifically described hereinbelow. The device 30 includes a base support tube 32 which is connected at one end to the tank outlet boss 34 mounted through the wall 36 of the tank or sphere 12. A recess coupling 38 is provided on the outer end of the boss 34 to provide a means for connecting the outlet pipe 22. The opposite end 40 of the base support tube 32 is sealed and a plurality of slotted openings 42 can be provided around the outer circumference of the tube 32 and spaced slightly from the closed end 40. A relatively flat, hollow disk-shaped support structure 44 is arranged to be mounted on the support tube 32 with the interior of the enclosed support structure 44 arranged to communicate with the openings 42.

The support structure 44 can include a flat top circular support member 46 and a conical bottom member 48. The top and bottom support members 46 and 48 include a series or pattern of apertures 50 arranged across most of the surface of these members. These apertures can be of any required size such as $\frac{1}{8}$th to $\frac{3}{8}$ths inches in diameter or can be of any shape and size desired such as oblong, slotted, square, rectangular, etc.

Attached to the outer surfaces of support members 46 48 is screen material 52, 54. The outer edges of this material is secured to the perimeter of the support members 46, 48 by any suitable means such as spot welds 56. The edges of the screen members 52, 54 should be closely adhered to the support members to provide a substantial seal to prevent bypassing of the liquid or gas around the screen surfaces.

The screen surfaces can be formed from any material which would be compatible with the liquid which is anticipated to be used in the tanks. In most cases the screen material can be made from stainless steel, aluminum, brass, copper, nylon, plastics or any other synthetic material which would provide the desired results. The diameter of the wire used to fabricate the screen can be varied according to the size of opening desired. The openings in the screen material should be sized according to the surface tension of the liquid whereby capillary attraction will cause a liquid film or interface to be formed across the material. Thus, various mesh sizes can be used depending upon the liquid to provide the desired capillary attraction. By maintaining the screen in a wetted condition pressurization gas is prevented from entering the outlet opening so long as liquid remains in contact with one of the surface tension devices.

While a specific embodiment of the invention has been described and shown in this specification, it is to be understood that this description is for illustration purposes only and that other embodiments obtaining the same results and changes and variations in the described embodiment may be made without departing from the spirit and scope of the invention.

What is claimed is:

1. A flow control system for dispensing liquid from a multiple tank arrangement, the outlet and inlet from each tank being connected in parallel to a common outlet and inlet pipe whereby pressurization gas within the individual tanks is prevented from entering the outlet pipe until the liquid within all of the tanks has been dispensed, the control system comprising:
   a. a plurality of liquid storage tanks, each of said tanks having an outlet and inlet pressurization pipe, said outlet pipe being connected at a common junction to all other tank outlet pipes, and a common outlet pipe extending from said common junction, said tank outlet pipes and the common pipe being sized to carry the maximum flow rate required of the system and to minimize the pressure drop through the individual tank outlets when the liquid is flowing at the maximum required flow rate said inlet pressurization pipe being connected at a common inlet junction to all other tank inlet pressurization pipes and a common inlet pressurization pipe extending from said common inlet junction; and
   b. each tank includes a liquid surface tension retaining device in the form of a hollow disk shaped structure having generally flat support members and woven screen-type material mounted over the outer surface of said support members, said tension device being mounted so as to enclose the outlet opening from said tank, said surface tension device being capable of retaining a liquid/gas interface film to prevent the pressurization gas within the tank from passing into the common outlet pipe when the liquid within the tank is depleted.

2. A flow control system as defined in claim 1 wherein each of said surface tension devices includes a porous surface having pores sized to pass the maximum required liquid flow rate and produce the liquid/gas interface film having a pressure retention capability which is greater than the pressure drop throughout the respective device and outlet pipe.

3. A flow control system as defined in claim 2 wherein said surface tension device includes a screen mesh material mounted on the outside surface of said device, said screen material having openings sized to maintain said required interface film.

4. A flow control system as defined in claim 1 wherein each of said tanks includes an internal outlet pipe connected to the tank outlet and said surface tension device is mounted on said outlet pipe so as to completely enclose the opening within said outlet pipe.

5. A flow control system as defined in claim 1 wherein said support members have a plurality of apertures formed across a significant portion of the surface of said device, said apertures being sized to provide adequate structural support for said woven material and yet provide a sufficiently low pressure drop while the liquid is flowing at the desired flow rate.

6. A flow control system as defined in claim 5 wherein the apertures in said support member are sized within the range of ⅛th to ⅜ths inch diameter.

* * * * *